Feb. 13, 1923.

C. W. BENNETT ET AL 1,444,999

MAGNETIC CONVEYER

Filed Nov. 20, 1920

INVENTORS
Charles W. Bennett
and
Lawrence C. Steele
by D. Anthony Usina
their Attorney.

Feb. 13, 1923. 1,444,999
C. W. BENNETT ET AL
MAGNETIC CONVEYER
Filed Nov. 20, 1920   4 sheets-sheet 2
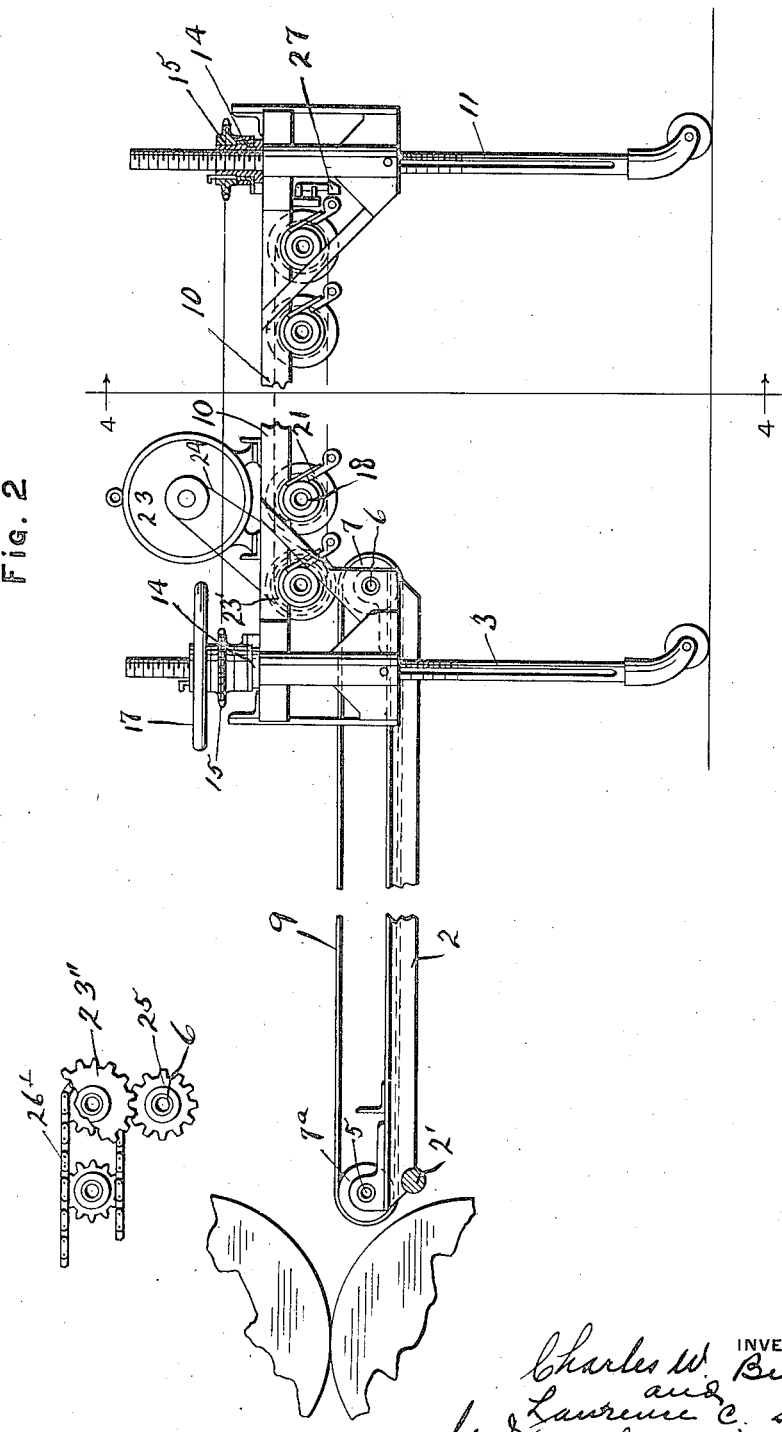

Feb. 13, 1923.
C. W. BENNETT ET AL
1,444,999
MAGNETIC CONVEYER
Filed Nov. 20, 1920
4 sheets-sheet 3
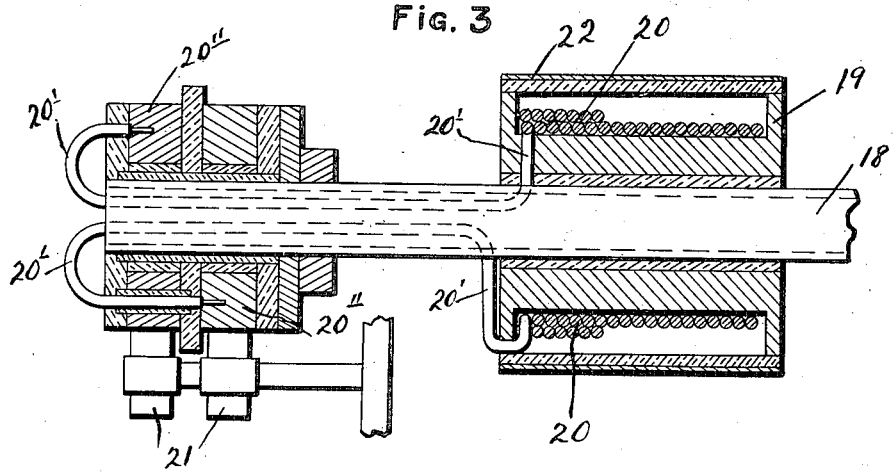
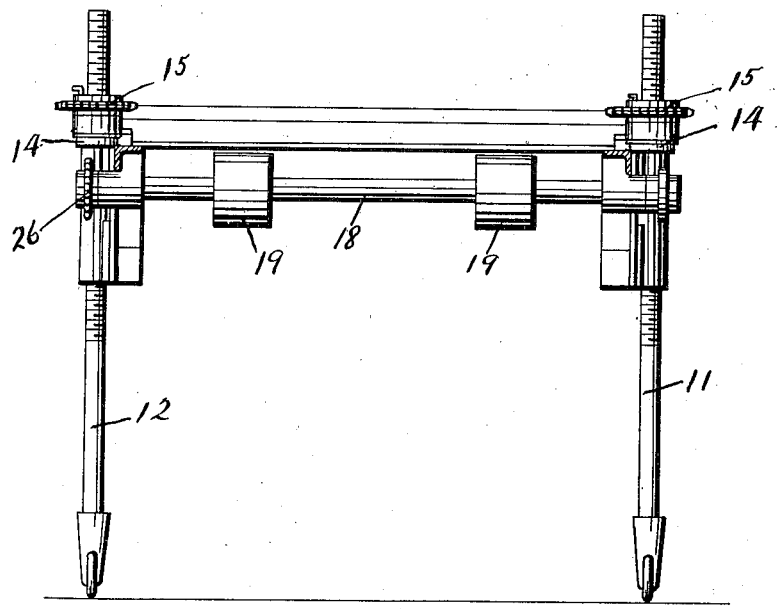
INVENTORS
Charles W. Bennett
and
Lawrence C. Steele
by D. Anthony Usina
their Attorney Feb. 13, 1923.

C. W. BENNETT ET AL

MAGNETIC CONVEYER

Filed Nov. 20, 1920

Patented Feb. 13, 1923.

1,444,999

UNITED STATES PATENT OFFICE.

CHARLES W. BENNETT AND LAWRENCE C. STEELE, OF PITTSBURGH, PENNSYLVANIA, ASSIGNORS TO AMERICAN SHEET AND TIN PLATE COMPANY, OF PITTSBURGH, PENNSYLVANIA, A CORPORATION OF NEW JERSEY.

MAGNETIC CONVEYER.

Application filed November 20, 1920. Serial No. 425,362.

*To all whom it may concern:*

Be it known that we, CHARLES W. BENNETT and LAWRENCE C. STEELE, both citizens of the United States, and residents of Pittsburgh, in the county of Allegheny and State of Pennsylvania, have invented certain new and useful Improvements in Magnetic Conveyers, of which the following is a specification.
This invention relates to conveying tables, and more particularly to conveying tables for use in conveying and packing steel plates, and has for its principal object the provision of such conveyer that will convey polished steel plates to a given point and pile them without marring or scratching their surfaces.

Another object is to provide such a device which will be adjustable and also one that may be readily removed from place to place.

A further object is to provide magnetic means for holding the metal plates in contact with the rolls.
A still further object is to provide means operable by the plates being conveyed for breaking the circuit to the magnetic means, thereby allowing the plates to drop upon a pile.
Other objects and advantages will be readily apparent in the following description, taken with the several views of the drawings.

Heretofore, it has been the practice to remove the polished steel plates from the rolls by hand, and carefully pile them so as not to scratch or mar their surfaces. This practice is slow and tedious and entails considerable expense.
Numerous mechanical devices have been devised for automatically conveying and piling polished plates, but all have failed for one reason or another. The principal reason being that such devices invariably marred the surface of the plates during the conveying or piling process.

Referring particularly to the drawings, Figure 1 is a top plan view, partly broken away, showing the preferred form of conveyer.

Figure 2 is a side elevation of the device shown in Figure 1.

Figure 3 is an enlarged detail sectional view of one of the magnetic rollers of our conveyer, showing the contact brushes on the roller shaft.

Figure 4 is a cross sectional view on the line 4—4 of Figure 2.

Figure 7 is a detail view of the gear connection for driving the conveyers of the forward table.

Figure 1:
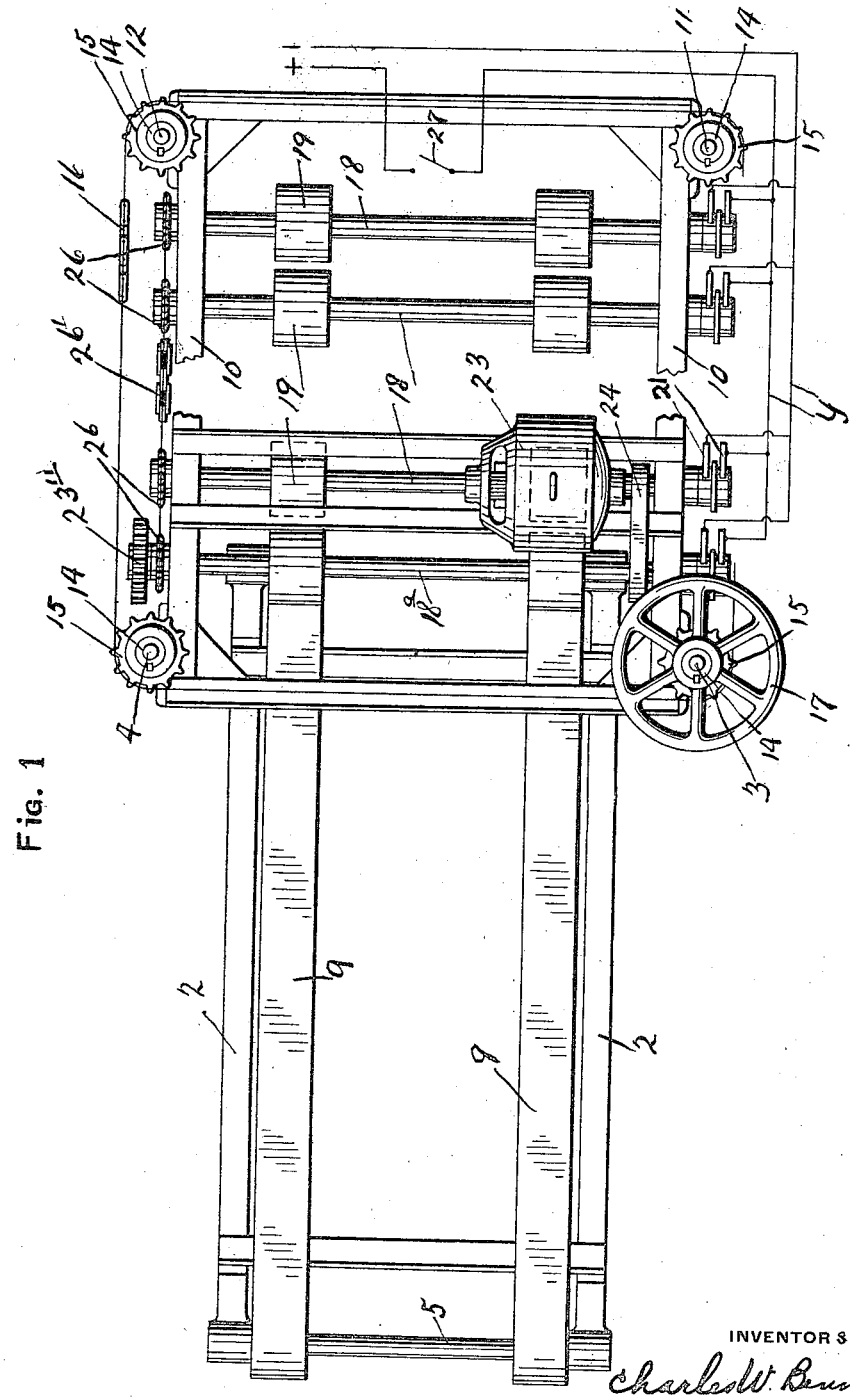

Our improved conveyer comprises a table composed of a rectangular frame member 2 adapted to have its one end supported on the bar 2' of a rolling mill, and its other end adjustably supported by standards 3 and 4. A shaft 5 is journaled adjacent the one end of the frame member 2, and a second shaft 6 is journaled adjacent to the other end. The shafts 5 and 6 have pairs of pulleys 7 mounted thereon, and suitable flexible conveyers 9 are trained about each pair of said pulleys. The conveyers 9 are preferably composed of leather or canvas to prevent scratching or marring of the plates.

A second table comprising a rectangular frame member 10 has its one end adjustably mounted on the supports or standards 3 and 4 above the frame 2, and its other end adjustably supported on other standards 11 and 12 at a slightly lower level than the first named standards, for a purpose to be described.

The standards 3, 4, 11 and 12 are screw threaded for the purpose of adjusting the position of the conveyer table. Collar members 14 are rotatably mounted in the frames 10 and are in threaded engagement with the standards 3, 4, 11 and 12, and have sprocket wheels 15 secured thereto adapted to have an operating chain 16 trained about them for simultaneously revolving all of said collar members. One of the sprocket wheels 15 has a hand operating wheel 17 secured thereto, adapted to be turned by hand, thus imparting movement to the chain 16 and sprocket wheels 15, which in turn will move the conveyer tables upwardly or downwardly, according to the direction of rotation.

The table 10 has a plurality of hollow shafts 18 journaled therein at spaced intervals, each of which carries magnetic rolls 19. The magnetic rolls 19 are spaced upon the shafts 18 and have magnetic windings 20 in their interior which magnetize them sufficiently to hold the plates being conveyed in frictional engagement therewith.

The magnetic windings 20 are supplied with current by means of suitable wires 20' which pass through the hollow shaft 18 and which are connected with contact collars 20'', which receive current from feed wires Y through brush contacts 21 which are in engagement with contact collars 20''.

Plates adapted to be conveyed by this device are light and have a very highly polished surface. Therefore, the rolls 19 are covered with a soft surface material 22 such as leather or canvas to prevent the plates coming in contact with a hard surface and being marred.

An electric motor 23 or other source of power is mounted on the frame 10 and furnishes the necessary operating power for the whole conveyer.

The motor 23 is connected with sprocket 23' on the shaft 18$^a$ by a belt 24. A suitable gear member 23'' is also mounted on the shaft 18$^a$ and is in mesh with the gear 25 on the shaft 6 in frame 2, thereby furnishing power to conveyers 9. Each of the shafts 18 have a sprocket wheel 26 on their one end, and all of said sprockets are operatively connected with a chain 26', thus causing simultaneous rotation of all the shafts and their associated magnetic rolls when the motor 22 is operated.

An automatic circuit breaker 27 is mounted on the frame 10 at the forward end, and is adapted to be opened by the metal sheets striking it as they reach the limit of their travel, thus breaking the circuit to the magnets 20, and to close by gravity so as to again complete the circuit to the magnets 20.

The operation of the above described conveyer is as follows:—

The plates of highly polished steel will be received from the rolling mill upon the conveyers 9 and will be conveyed forward until they strike or come in contact with the first set of magnetic rolls 19. The plates will then be suspended against the under side of the rolls 19 by means of the magnetic forces exerted by the windings 20, and they will be compelled to travel forward in the magnetically suspended position as such rolls rotate.

As the plates reach their limit of travel they will strike the circuit breaker 27, thus cutting off or breaking the circuit to the rolls 19 and allowing the plates to be dropped or released for piling. The table or frame 10, as has been said, has its forward end slightly lower than its rear end. This position of the table serves to allow the one edge of the plate to strike the pile first and then the remainder of the plate will be cushioned with air as it continues its downward course. Thus piling will be accomplished automatically, and with a minimum of scratching.

Figure 5:
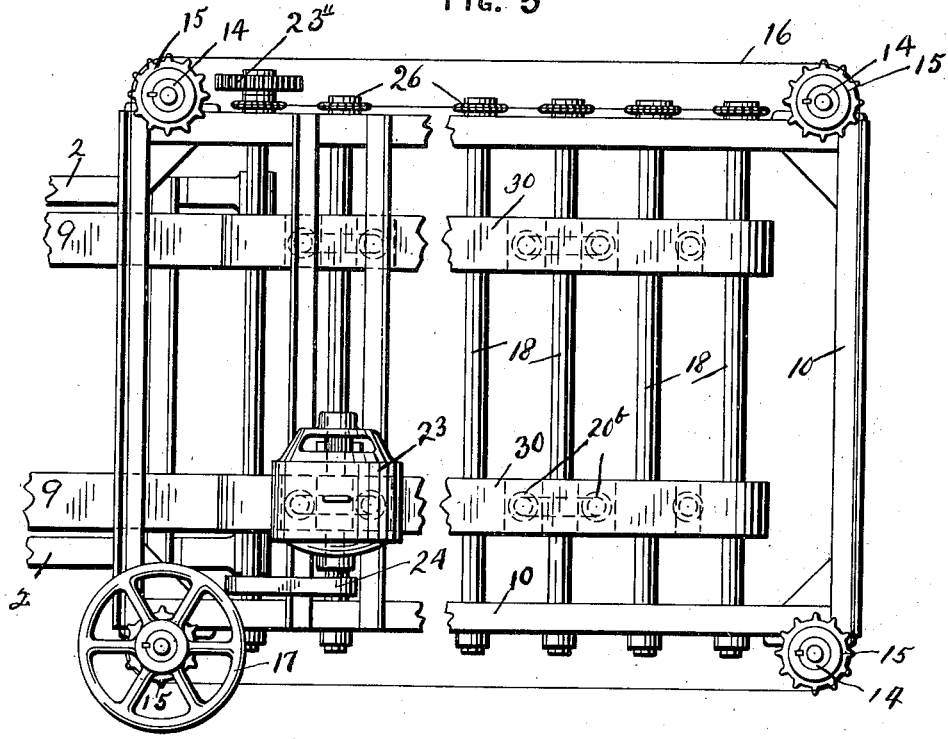
Figure 5 is a top plan view of the magnetic conveying table of slightly modified form.
Figure 6:
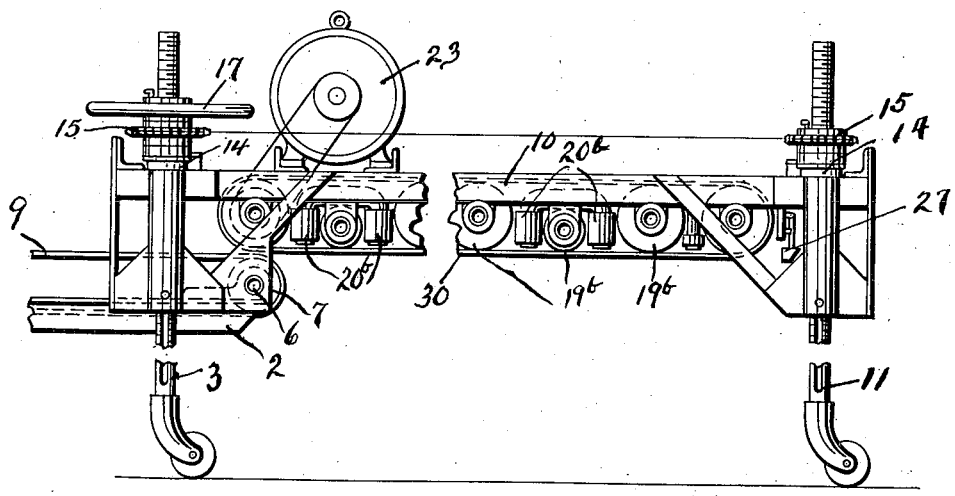
Figure 6 is a side elevation of the table shown in Figure 5.

In Figures 5 and 6 we have shown a modified construction. The same reference numerals will be used to designate the similar parts primed by "b". The general construction of the modification is the same with the exception that the rolls or pulleys 19$^b$ alternate, large and small, and the magnet members 20$^b$ are secured to and supported from the frame of the conveyer and extend downwardly between the rolls or pulleys. A conveyer belt 30 is trained over the pulleys 19$^b$ and is adapted to carry the plates forward in a suspended position. The magnets 20$^b$ are spaced above the bottom plane of the roll or pulleys, and above the belt 30 so as not to come in contact with the plates being conveyed, but are of such strength that they will hold the plates in suspended engagement with the said belt 30, thus causing them to move with said belt. Other than the arrangement of the magnets and the conveyer belt, this modified arrangement is similar to the construction and operation of the form shown in the other views of the drawing, and it is not thought necessary to go into further details of description.

We claim:—

1. In a conveyer of the class described, a conveying member comprising a plurality of rolls, magnetic means arranged to hold the articles being conveyed in frictional engagement with the bottom faces of said rolls, and means for automatically breaking the circuit to said magnetic means when the article being conveyed reaches a predetermined point in its travel.

2. In a conveyer of the class described, conveying members, one of said conveying members comprising a table member, a plurality of rolls journalled in said table member, and magnetic means arranged in such relation with said rolls that they will hold the article being conveyed in frictional engagement with the bottom faces thereof, and means operable by the article being conveyed for breaking the circuit to said magnetic means.

3. A conveyer of the class described, comprising a pair of table members, one of said table members being arranged on a plane above and beyond the other, a conveyer on the lower one of said tables being adapted to carry the article being conveyed, a plurality of conveying rolls journaled in said second table, adapted to receive the article conveyed from said first named conveyer, and magnetic means arranged to hold the article being conveyed in frictional engagement with the bottom surface of said rolls.

4. A conveyer of the class described, comprising two table members, supports for said table members, said table members having a vertical adjustment on said supports, a flexible conveying member mounted on one of said tables adapted to carry the articles being conveyed, rollers journaled in the other of said tables, magnetic means arranged in such relation with said rollers that they will hold the articles being conveyed in frictional engagement therewith, and means operable by the articles being conveyed for breaking the circuit to said magnetic means, thereby releasing the articles being conveyed for piling.

5. A conveyer and piling device comprising adjustably mounted conveyer tables, supports for said tables, conveying means mounted on one of said tables, conveying means mounted on the other of said tables and arranged on a plane above the conveying means on said first named table, magnetic means arranged with relation to said second named conveying means and adapted to hold the articles being conveyed in frictional engagement with the bottom face of said conveying means, and a circuit breaker adapted to be operated by the article being conveyed for breaking the circuit to said magnetic means, thereby releasing the articles for piling.

6. A conveyer and piling device comprising adjustably mounted conveyer tables, supports for said tables, a flexible conveyer mounted on one of said tables, a plurality of conveyer rolls journaled in the other of said tables, said last named table being arranged on a plane above saaid first named table, magnetic means arranged in relation with said rollers and adapted to hold the articles being conveyed in frictional engagement with the bottom faces of said rolls, and a circuit breaker adapted to be operated by the article being conveyed for breaking the circuit to said magnetic means, thereby releasing the articles for piling.

7. A conveyer and piling device comprising adjustably mounted conveyer tables, supports for said tables, a flexible conveyer mounted on one of said tables, a plurality of conveyer rolls journaled in the other of said tables, said last named table being arranged on a plane above said first named table, magnetic means arranged within said rollers and adapted to exert their energy through the same to hold the articles being conveyed in relation with said rollers, and adapted to hold the articles being conveyed in frictional engagement with the bottom faces of said rolls, and a circuit breaker adapted to be operated by the article being conveyed for breaking the circuit to said magnetic means, thereby releasing the articles for piling.

8. A conveyer and piling device comprising a pair of adjustably mounted conveyer tables, supports for said tables, means for adjusting said tables relative to said supports, a flexible belt conveyer mounted on one of said tables, a plurality of conveyer rolls journaled in the other of said tables, said last named table being arranged on a plane above said first named table, magnetic means arranged in relation with said rollers and adapted to hold the articles being conveyed in frictional engagement with the bottom faces of said rolls, and means for breaking the circuit to said magnetic means, thereby releasing the articles for piling.

9. A conveyer and piling device comprising adjustably mounted conveyer tables, supports for said tables, means for adjusting said tables relative to said supports, a flexible belt conveyer mounted on one of said tables, a plurality of conveyer rolls journaled in the other of said tables, said last named table being arranged on a plane above said first named table, magnetic means being arranged in relation with said rollers and adapted to hold the articles being conveyed in frictional engagement with the bottom faces of said rolls, and a circuit breaker adapted to be operated by the article being conveyed for breaking the circuit to said magnetic means, thereby releasing the articles for piling, and means for operating said flexible conveyer and said rolls.

10. In a conveyer of the class described, conveying means for conveying metal sheets, said conveying means having a non-metallic surface, magnetic means arranged to hold the sheets being conveyed in frictional engagement with the under side of said conveying means, and means for automatically breaking the circuit to said magnetic means when said sheets reach a predetermined point.

11. In a conveyer of the class described, conveying means for conveying metal sheets, magnetic means arranged to hold the sheets being conveyed in frictional engagement with the under side of said conveying means, and means operable by the article being conveyed for breaking the circuit to said magnetic means.

In testimony whereof we have hereunto signed our names.

CHARLES W. BENNETT.
LAWRENCE C. STEELE.